US 9,514,547 B2

United States Patent
Nagatomi et al.

(10) Patent No.: US 9,514,547 B2
(45) Date of Patent: Dec. 6, 2016

(54) DRIVING SUPPORT APPARATUS FOR IMPROVING AWARENESS OF UNRECOGNIZED OBJECT

(71) Applicant: DENSO CORPORATION, Kariya, Aichi-pref. (JP)

(72) Inventors: Yasutsugu Nagatomi, Chiryu (JP); Tadashi Kamada, Nagoya (JP); Akira Takahashi, Nisshin (JP); Yukimasa Tamatsu, Okazaki (JP); Ryusuke Hotta, Nagoya (JP); Shohei Morikawa, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/326,805

(22) Filed: Jul. 9, 2014

(65) Prior Publication Data
US 2015/0015596 A1    Jan. 15, 2015

(30) Foreign Application Priority Data
Jul. 11, 2013    (JP) .................................. 2013-145592

(51) Int. Cl.
| G06T 11/00 | (2006.01) |
| G06K 9/00 | (2006.01) |
| B60R 1/00 | (2006.01) |
| G08G 1/16 | (2006.01) |
| B60R 21/01 | (2006.01) |

(52) U.S. Cl.
CPC ............... *G06T 11/001* (2013.01); *B60R 1/00* (2013.01); *G06K 9/00805* (2013.01); *G08G 1/166* (2013.01); *B60R 2021/01013* (2013.01); *B60R 2300/307* (2013.01); *B60R 2300/802* (2013.01); *G06T 2207/20192* (2013.01)

(58) Field of Classification Search
USPC ...... 345/589; 382/104; 340/937, 932.2, 988; 348/169
See application file for complete search history.

(56) References Cited

U.S. PATENT DOCUMENTS

| 6,327,522 B1 | 12/2001 | Kojima et al. |
| 8,798,841 B1 * | 8/2014 | Nickolaou ......... B62D 15/0265 340/435 |
| 2008/0317287 A1 * | 12/2008 | Haseyama ................ B60R 1/00 382/103 |
| 2009/0101820 A1 * | 4/2009 | Nakata ................. H04N 5/2354 250/330 |

(Continued)

FOREIGN PATENT DOCUMENTS

| JP | 2004-106682 A | 4/2004 |
| JP | 2004-364112 A | 12/2004 |

(Continued)

*Primary Examiner* — Barry Drennan
*Assistant Examiner* — Terrell Robinson
(74) *Attorney, Agent, or Firm* — Posz Law Group, PLC

(57) ABSTRACT

When a driving support apparatus is under automatic driving of a vehicle or an automatic driving button is pressed under manual driving, vicinity image data is acquired from an in-vehicle camera. When a predetermined target object is recognized in the vicinity image data, a visibility reduction process is applied to image data of the recognized target object. The visibility reduction process applies at least one of defocusing; decreasing color information; and decreasing edge intensity, to the image data of the recognized target object. In contrast, any visibility reduction process is not applied to any other image data other than the image data of the recognized target object. An image display apparatus displays the vicinity image by a combination of the image data of the recognized target object of which the visibility is reduced and the other image data of which the visibility is not reduced.

15 Claims, 3 Drawing Sheets

(56) References Cited

U.S. PATENT DOCUMENTS

| | | | |
|---|---|---|---|
| 2009/0303026 A1* | 12/2009 | Broggi | G01S 17/023 340/435 |
| 2010/0052885 A1* | 3/2010 | Hanqvist | G01J 5/0022 340/436 |
| 2010/0289634 A1* | 11/2010 | Ikeda | B60Q 9/005 340/441 |
| 2012/0062372 A1* | 3/2012 | Augst | G06K 9/00798 340/435 |
| 2012/0320212 A1* | 12/2012 | Aimura | B60R 1/00 348/148 |
| 2013/0044218 A1* | 2/2013 | Matsuda | B60R 1/00 348/148 |

FOREIGN PATENT DOCUMENTS

| | | |
|---|---|---|
| JP | 2008-027138 A | 2/2008 |
| JP | 2009-040107 A | 2/2009 |
| JP | 2009-277063 A | 11/2009 |
| JP | 2010-257234 A | 11/2010 |
| JP | 2012-171387 A | 9/2012 |

* cited by examiner

FIG. 3
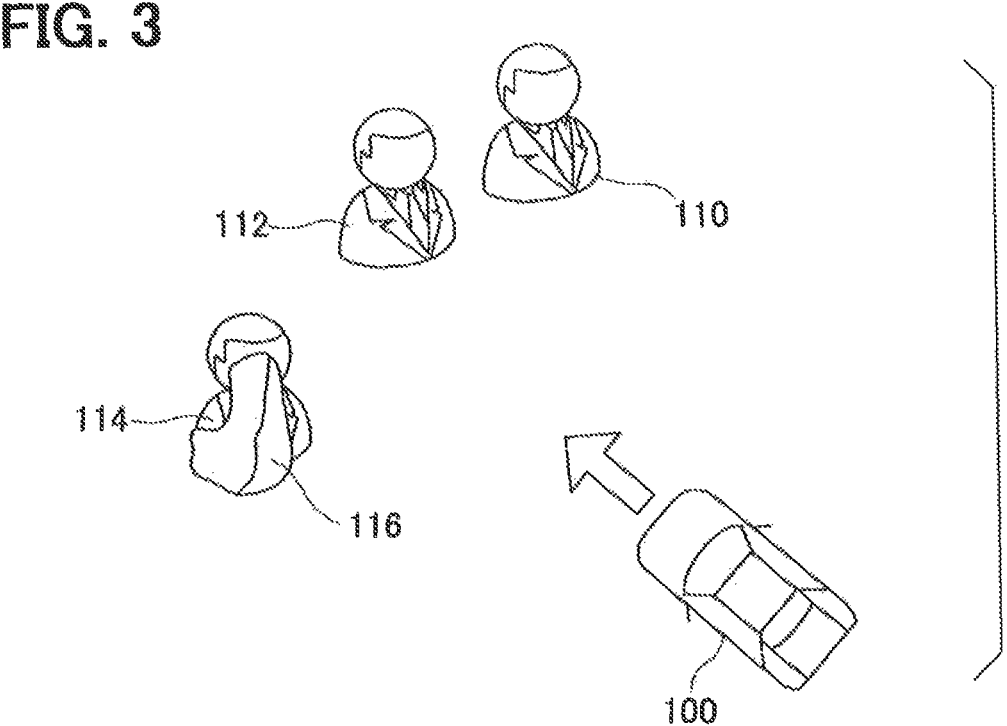
FIG. 4A
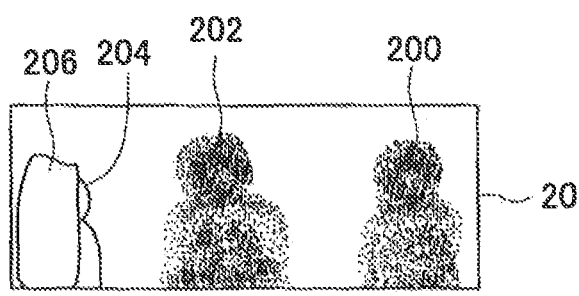
FIG. 4B COMPARATIVE
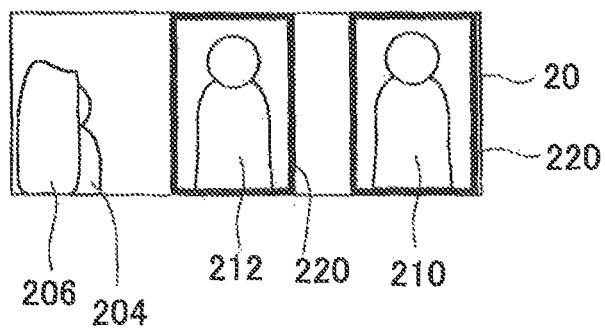

DRIVING SUPPORT APPARATUS FOR IMPROVING AWARENESS OF UNRECOGNIZED OBJECT

CROSS REFERENCE TO RELATED APPLICATION

The present application is based on Japanese Patent Application No. 2013-145592 filed on Jul. 11, 2013, the disclosure of which is incorporated herein by reference.

TECHNICAL FIELD

The present disclosure relates to a driving support apparatus that supports driving of a vehicle based on a state in vicinity of the vehicle.

BACKGROUND ART

Patent Literature 1: JP 2012-171387 A

There is a technology to capture an image of a vicinity state (state in vicinity) of a vehicle with an in-vehicle camera to enable a vehicle to recognize the vicinity state of the vehicle based on the captured image (for example, refer to Patent Literature 1).

The technology in Patent Literature 1 recognizes a predetermined target object such as a pedestrian from the captured image data and displays the target object in a display apparatus to be highlighted by surrounding the target object with a rectangular frame having high brightness. This enables the driver to recognize the presence of the target object clearly in the display apparatus even in a less-visible state such as a nighttime state that does not permit naked eyes to see it easily.

Further, a target object may be hidden by a different object; this may disable the vehicle (i.e., an in-vehicle image recognition apparatus) to recognize the target object from the captured image data even though the target object is actually present. In this case, the unrecognized target object appears in the display apparatus directly without any change from the captured image data while being not surrounded with any frame for highlighting. In contrast, a recognized target object appears in the display apparatus to be highlighted while being surrounded with a frame for highlighting.

In such a display manner, the driver may be attracted by the target object that appears in the display apparatus to be highlighted by being surrounded with the frame based on the recognition by the vehicle, whereas the driver may find a difficulty to recognize in the display apparatus a target object that appears without being surrounded with any frame due to a failure in the recognition by the vehicle. That is, when both the vehicle and the driver do not recognize a target object, there is a possibility to lead to the failure in taking an appropriate measure to the target object that is not recognized.

In contrast, if a target object recognized by the vehicle is displayed without any surrounding frame; any target objects appear in the display apparatus under an identical condition regardless of whether a target object is recognized by the vehicle or not. However, this display manner of displaying all the target objects under the identical condition makes it difficult for the driver to understand which target object is recognized by the vehicle. As a result, the driver becomes uneasy about whether the vehicle can provide a suitable driving support by recognizing any necessary target object.

SUMMARY

It is an object of the present disclosure to provide a driving support apparatus to enable a driver of a vehicle to pay attention to a target object unrecognized by the vehicle.

To achieve the above object, according to an example of the present disclosure, a driving support apparatus that supports driving of a vehicle based on a vicinity state while cooperating with a display apparatus is provided to include an information acquisition section, a recognition section, a drawing section, and a visibility reduction section. The information acquisition section acquires vicinity information expressing the vicinity state of the vehicle. The recognition section recognizes at least one object in the vicinity of the vehicle based on the vicinity information acquired. The drawing section draws or displays in the display apparatus a vicinity image that expresses the vicinity state of the vehicle based on the vicinity information acquired. The visibility reduction section reduces a visibility of a predetermined target object when the target object is displayed within the vicinity image in the display apparatus, the target object being included in the at least one object recognized in the vicinity of the vehicle by the recognition section.

Such a configuration permits the display apparatus to reduce a visibility of a target object recognized by the vehicle; this permits the driver to understand that the target object of which the visibility is reduced is already or certainly recognized by the vehicle. Further, since the target object is reduced in its visibility, the driver is not particularly attracted by that target object. This permits the driver to afford to pay attention to a target object that is not recognized by the vehicle.

Further, since the driver understands that the target object of which the visibility is reduced is recognized by the vehicle, the driver can determine that the vehicle can provide an appropriate driving support against the target object of which the visibility is reduced.

Furthermore, as an optional configuration, the above driving support apparatus may be provided with an automatic driving section that conducts automatic driving of the vehicle based on a recognition result of the recognition section. In this case, the driver can leave to the vehicle a driving operation against the target object of which the visibility is reduced in the display apparatus based on the recognition by the vehicle, whereas the driver affords to pay attention to an object other than the target object recognized by the vehicle. This can reduce a load of the driver against the driving manipulation.

BRIEF DESCRIPTION OF THE DRAWINGS

The above and other objects, features, and advantages of the present disclosure will become more apparent from the following detailed description made with reference to the accompanying drawings. In the drawings:

FIG. 3 is a diagram schematically illustrating pedestrians forward of a vehicle; and FIG. 4A is a diagram illustrating a display manner according to the embodiment of the present disclosure whereas FIG. 4B is a diagram illustrating a display manner of a comparative example.

DETAILED DESCRIPTION

Figure 1:
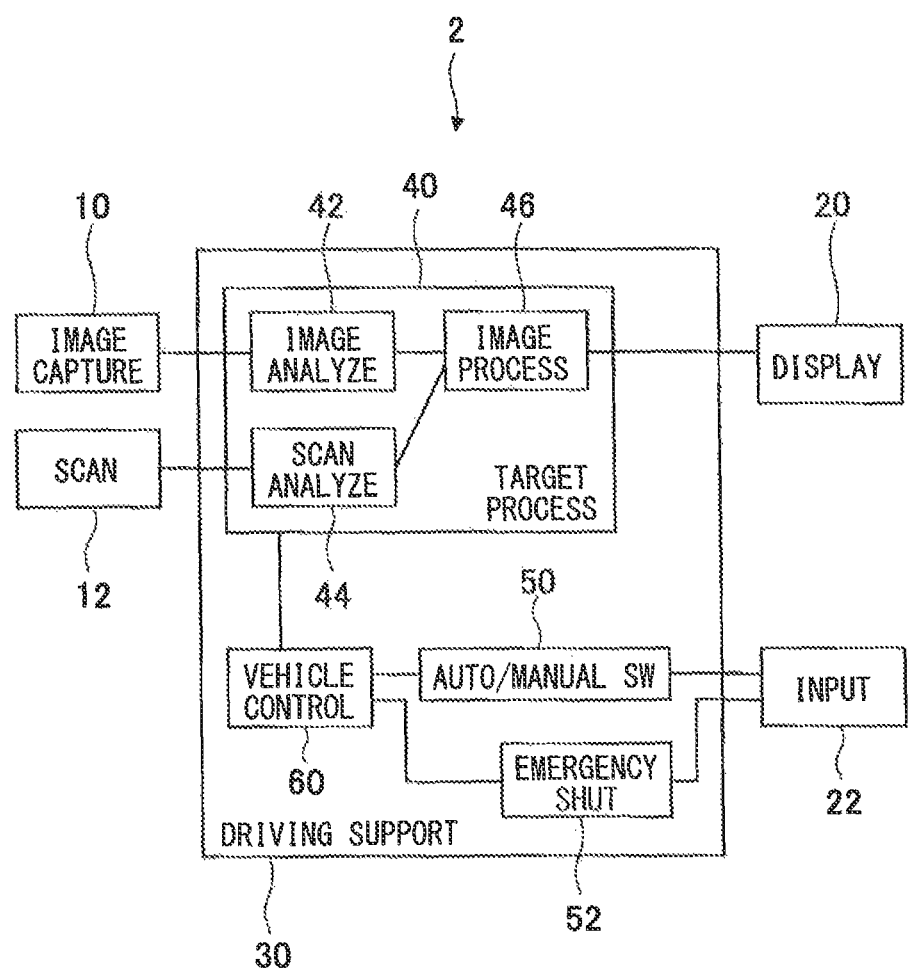
FIG. 1 is a block diagram illustrating a driving support system according to an embodiment of the present disclosure.

The following describes an embodiment of the present disclosure with reference to drawings. With reference to FIG. 1, a driving support system 2 according to an embodiment of the present disclosure is mounted in a vehicle and includes an image capture apparatus 10, a scan apparatus 12, an image display apparatus 20, an input apparatus 22, and a driving support apparatus 30.

The image capture apparatus 10 includes an in-vehicle camera, which includes an image sensor, an amplifier, and an A/D converter; the image sensor includes a CCD image sensor or CMOS image sensor. The amplifier and A/D converter amplify an analog signal, which indicates a luminance of each pixel of an image, with a predetermined gain when the image is captured by the image sensor, and convert the amplified analog signal into a digital signal. The image capture apparatus 10 outputs the image data, which is converted into the digital signal or digital value, to the driving support apparatus 30.

The scan apparatus 12 includes a radar apparatus, which radiates laser or millimeter wave in a direction forward of the vehicle to scan a detection area with a predetermined angle range in a horizontal direction and receives a reflected wave. Based on the received reflected wave, the scan apparatus 12 outputs scanned information to the driving support apparatus 30; the scanned information includes detection information about an object existing in an area forward of the vehicle such as a shape, a distance from the vehicle, a relative speed with the vehicle, a lateral position from the vehicle.

The image display apparatus 20 includes a display unit or HUD (Head Up Display) installed in a front panel etc. The input apparatus 22 includes switches that the driver manipulates. The driving support apparatus 30 includes a target processing portion 40, an automatic/manual driving switch portion 50, an emergency shut-down portion 52, and a vehicle control portion 60. The target processing portion 40 includes an image analysis portion 42, a scanning analysis portion 44, and an image processing portion 46. One or both of the target processing portion 40 and the vehicle control portion 60 may be configured as a control circuit that includes a known computer containing a CPU, ROM, and RAM. The processes executed by the target processing portion 40, the processes executed by the portions 42, 44, 46 of the target processing portion 40, or the processes executed by the vehicle control portion 60 may be achieved by the above CPU of the control circuit executing various corresponding software programs in the RAM or ROM. Further, the above control circuit may be also configured to include one or more than one hardware integrated circuit to execute the various processes.

The image analysis portion 42 recognizes an object in vicinity of the vehicle based on image data which the image capture apparatus 10 outputs. The image analysis portion 42 includes a dictionary database (DB) for analyzing image data and recognizes a pedestrian, a vehicle, a traffic signal, etc. as an object in vicinity of the vehicle by comparing the image data with the dictionary DB.

The scanning analysis portion 44 recognizes an object in vicinity of the vehicle based on scanned information which the scan apparatus 12 outputs. The image processing portion 46 executes a visibility reduction process based on the analysis result of the image analysis portion 42 and the scanning analysis portion 44. The visibility reduction process is to reduce a visibility of a predetermined target object (i.e., a display image of the target object) when the target object is displayed as a display image in the image display apparatus 20; the predetermined target object is included within the objects recognized by the image analysis portion 42 and/or scanning analysis portion 44. The image processing portion 46 permits the image display apparatus 20 to perform a display of a vicinity image in vicinity of the vehicle by a combination of (i) a recognized-target-object image data of which the visibility is reduced and (ii) other image data of which the visibility is not reduced, or to display simultaneously (i) a recognized-target-object image data of which the visibility is reduced and (ii) other image data of which the visibility is not reduced. The visibility reduction process by the image display apparatus 20 is mentioned later.

The automatic/manual driving switch portion 50 detects that the driver presses the automatic driving button or manual driving button in the input apparatus 22, thereby instructing the vehicle control portion 60 to conduct either the automatic driving or the manual driving. The emergency shut-down portion 52 detects that the driver presses the emergency shut-down button, thereby instructing the vehicle control portion 60 to conduct the emergency shut-down of the vehicle.

The automatic driving is to take place from when the automatic driving button is pressed to when the manual driving button is pressed. Alternatively, the automatic driving is to take place until a predetermined time passes in the state where the manual driving button is not pressed, and to be then switched into the manual driving when the predetermined time passes.

When the manual driving is instructed or required by the automatic/manual driving switch portion 50, the vehicle control portion 60 controls a fuel injection, a steering amount of the steering wheel, or a braking force of the brake based on the driving manipulation of the driver. When the automatic driving is instructed or required by the automatic/manual driving switch portion 50, the vehicle control portion 60 controls automatically a fuel injection, a steering amount of the steering wheel, or a braking force of the brake based on the recognition result relative to the target object by the target processing portion 40. The automatic driving is switched into the manual driving when the driver manipulates the steering wheel, the accelerator pedal, the brake pedal, etc. or presses the manual driving button. The vehicle control portion 60 may be also referred to as an automatic driving section/device/means.

(Driving Support Process)

Figure 2:
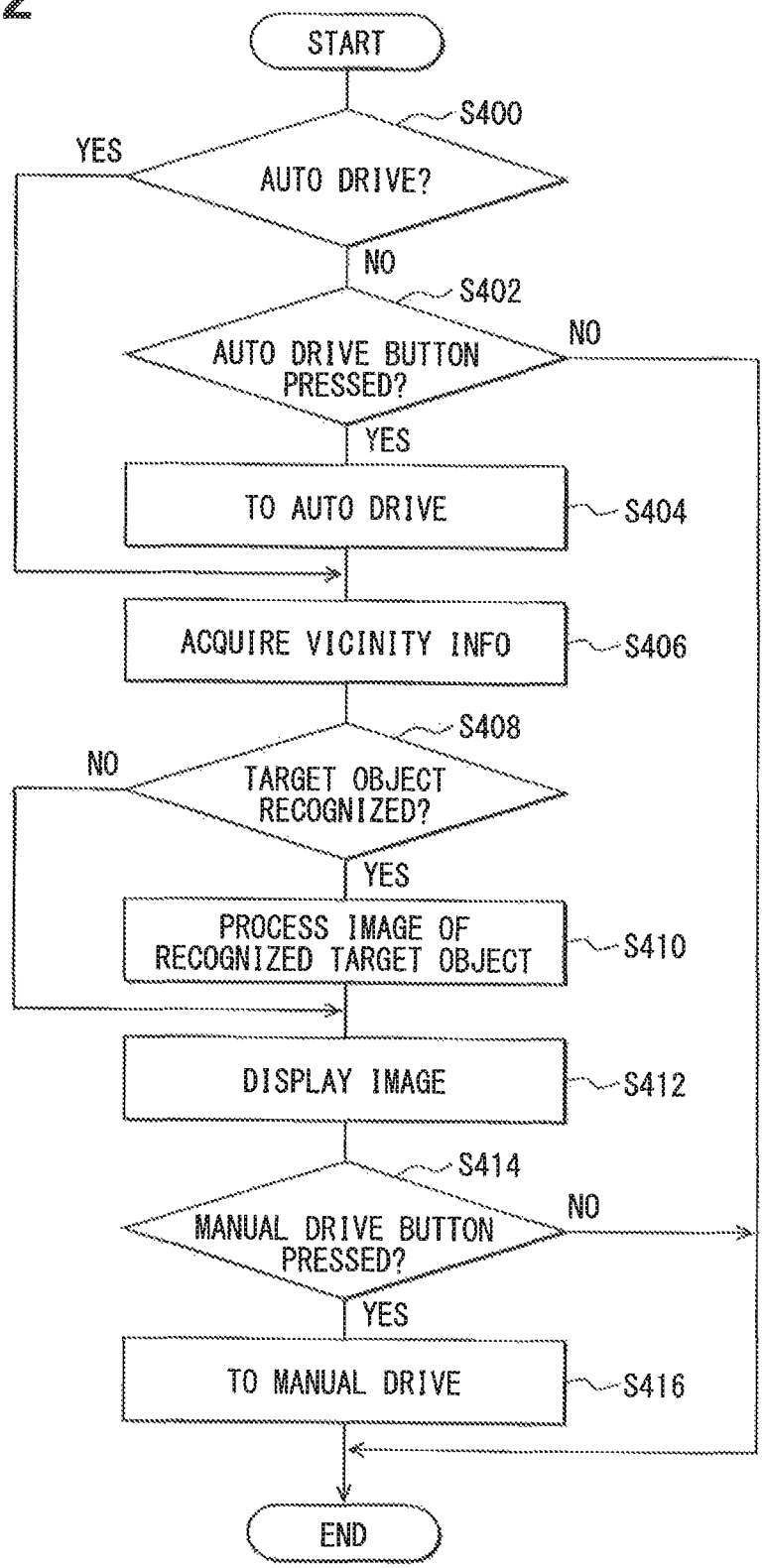
FIG. 2 is a flowchart diagram illustrating a driving support process.

The following will explain a driving support process executed by the driving support apparatus 30 with reference to FIG. 2. The driving support process of FIG. 2 is always executed. It is further noted that the driving support process or flowchart includes sections (also referred to as steps), which are represented, for instance, as S400. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

At S400, the driving support apparatus 30 determines whether the vehicle is under the automatic driving by determining whether the automatic driving button of the input apparatus 22 is pressed. When it is determined that it is under the automatic driving (S400: Yes), the processing proceeds to S406.

When it is determined that it is under the manual driving instead of the automatic driving (S400: No), it is determined whether the automatic driving button is pressed (S402). When it is determined that the automatic driving button is not pressed (S402: No), the present process ends.

When the automatic driving button is pressed during the manual driving (S402: Yes), the manual driving is switched into the automatic driving (S404). The processing then proceeds to S406. At S406, the driving support apparatus 30 acquires vicinity information indicating a vicinity state that is a state of vicinity of the vehicle; the vicinity information includes image data which the image capture apparatus 10 captures; and scanned information which the scan apparatus 12 scans. At S408, the driving support apparatus 30 determines whether a predetermined target object is recognized in the image data and the scanned information. For example, the predetermined target object includes a pedestrian.

For example, with reference to FIG. 3, the pedestrians 110, 112, and 114 are present ahead of the vehicle 100. In this case, the driving support apparatus 30 acquires the image data captured by the image capture apparatus 10, compares the image data with the dictionary DB, and determines whether the image data includes a pedestrian, or indicates a presence of a pedestrian. The driving support apparatus 30 determines whether the scanned information indicates a pedestrian or a presence of a pedestrian based on the scanning information acquired from the scan apparatus 12.

As a result, the driving support apparatus 30 recognizes each of the pedestrians 110 and 112 as a pedestrian serving as a predetermined target object in the present embodiment. In contrast, the pedestrian 114 carries baggage 116 such as a big golf bag, the pedestrian 114 cannot be recognized as a pedestrian based on the image data and scanned information.

When any target object such as a pedestrian is not recognized (S408: No), the processing proceeds to S412. When a target object such as a pedestrian is recognized (S408: Yes), the processing proceeds to S410, where a visibility reduction process is applied to an image data that corresponds to a display image of a recognized target object to reduce a visibility of the recognized target object (i.e., the display image of the recognized target object) in the image display apparatus 20. The visibility reduction process conducts any one or any combination of the following three image processes.

(1) Obscuring Images (Defocussing Images)

A display image or image data of a target object is smoothed using a smoothing filter, a Gaussian filter, or a median filter.

(2) Reducing Tone or Color Information

When an image data is color image data, color information of a display image or image data of a target object is reduced with gray scale transformation, binarization, or outlining the display image of the target object against a colored background.

(3) Reducing Edge Intensity

The intensity of the edge of a target object (i.e., a display image or image data of the target object) is reduced by changing the frequency of an edge of the display image or image data of the target object to approximate the surrounding frequency, with a Fourier transform or a use of a low pass filter.

At S412, the driving support apparatus 30 displays or draws an image (i.e., vicinity image) in the image display apparatus 20 by applying the visibility reduction process at S410 to an image data (i.e., recognized-target-object image data) of a recognized target object in the vicinity image to reduce a visibility of the display image of the recognized target object while not applying the visibility reduction process at S410 to any other image data excluding the recognized-target-object image data in the vicinity image.

As a result, as illustrated in FIG. 4A, the image data of each of the pedestrians 110 and 112 that is recognized as a pedestrian serving as a target object undergoes a visibility reduction process to reduce their visibility; thereby, the corresponding display images 200 and 202 appear to be obscure or inconspicuous.

In contrast, since the pedestrian 114 holds a large bag 116, the corresponding images 204 and 206 are not recognized as a target object serving as a pedestrian. Thus, the corresponding display images 204 and 206 appear without their visibility reduced. As explained above, in the displayed vicinity image illustrated in FIG. 4A, the display images 200 and 202 are not conspicuous; thus, the driver can determine that the driving support apparatus 30 recognizes certainly the pedestrians 110 and 112, which are displayed to be obscure, as a target object.

A comparative example is illustrated in FIG. 4B to perform a display where the display images 210 and 212 recognized as target objects appear along with the surrounding frame 220 providing high brightness. As compared with such comparative example in FIG. 4B, the present embodiment in FIG. 4A enables the driver to afford to pay attention to the corresponding images 204 and 206 of the pedestrian 114 and the bag 116 each of which is unrecognized as a target object.

When the display images or vicinity image is displayed in the image display apparatus 20 (S412), the driving support apparatus 30 determines whether the manual driving button is pressed in the input apparatus 22 during the automatic driving (S414). When it is determined that the manual driving button is pressed (S414: Yes), the driving support apparatus 30 switches the automatic driving into the manual driving (S416).

As mentioned above, according to the present embodiment, the image data of each of the pedestrians 110 and 112 that is recognized as a pedestrian serving as a target object undergoes visibility reduction process and is displayed in a state where their visibility is reduced; in contrast, the image data of each of the pedestrian 114 and the bag 116 that is not recognized as a pedestrian serving as a target object undergoes none of a visibility reduction process and is displayed in a state where their visibility is not reduced.

Thereby, the driver can pay attention to the display image 206 of the pedestrian 114, which the driving support apparatus 30 does not recognize, more rather than the display images 200 and 202 of the pedestrians 110 and 112, which the driving support apparatus 30 recognizes.

Further, the image data of each of the pedestrians 110 and 112 that is recognized as a pedestrian serving as a target object is displayed in a state where the visibility is reduced; this enables the driver to understand that the driving support apparatus 30 recognizes the pedestrians 110 and 112. Therefore, during the automatic driving, the driver can leave the measure against the pedestrians 110 and 112 whom the driving support apparatus 30 recognizes, to the vehicle (i.e., the driving support apparatus 30).

In addition, during the automatic driving, while paying attention to the display images 204 and 206 of the pedestrian 114 and the bag 116 not recognized by the driving support apparatus 30 as a target object, the driver can conduct a suitable driving manipulation when the vehicle approaches the pedestrian 114 holding the bag 116.

Other Embodiments

The above embodiment explains an example where a pedestrian is an object recognized as a target object. There is no need to be limited thereto. Other than a pedestrian, another such as a vehicle or bicycle may be included as a target object. In addition, the driving support process according to the present disclosure may be also applied to automatic driving during parking the vehicle without need to be limited to the automatic driving during traveling a road.

Even in such automatic driving during parking the vehicle, the image data of an object recognized as a target object undergoes visibility reduction process and is displayed in a state where the visibility is reduced; in contrast, the image data of an object unrecognized as a target object undergoes none of a visibility reduction process and is displayed as it is in a state where the visibility is not reduced. Thereby, the driver can pay attention to the display image of the object, which the driving support apparatus 30 does not recognize, more rather than the display image of the object, which the driving support apparatus 30 recognizes.

In the above embodiment, a target object is recognized based on two information sources of the image data of an object acquired by the image capture apparatus and the scanned information of an object by the scan apparatus such as shape, distance, position, speed. There is no need to be limited thereto. A target object may be recognized based on only one of the two information sources.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving support apparatus to support driving of a vehicle based on a vicinity state that is a state of vicinity of the vehicle while cooperating with a display apparatus, comprising:
    an information acquisition section to acquire vicinity information expressing the vicinity state of the vehicle;
    a recognition section to recognize
        at least one object in the vicinity of the vehicle based on the vicinity information acquired, and
        a predetermined target object that is included in the at least one object recognized in the vicinity of the vehicle;
    a drawing section to display in the display apparatus a vicinity image that expresses the vicinity state of the vehicle based on the vicinity information acquired;
    a visibility reduction section to reduce a visibility of the predetermined target object when the predetermined target object is displayed within the vicinity image in the display apparatus,
    wherein:
        the at least one object recognized by the recognition section includes a pedestrian and a different object other than the pedestrian; and
        the pedestrian that is recognized as the at least one object by the recognition section becomes the predetermined target object whose visibility is reduced in the vicinity image by the visibility reduction section; and
    an automatic driving section to drive the vehicle automatically while noticing the pedestrian corresponding to the target object whose visibility is reduced by the visibility reduction section in the vicinity image in the display apparatus based on a recognition result by the recognition section,
        (i) the visibility of the predetermined target object is reduced by the visibility reduction section to indicate that the predetermined target object is already noticed as a pedestrian by the automatic driving section,
        (ii) the visibility of an object other than the predetermined target object is not reduced by the visibility reduction section to indicate that a driver of the vehicle should pay attention to the predetermined target object which is unseen by the automatic driving section as the pedestrian.

2. The driving support apparatus according to claim 1, wherein
    the visibility reduction section reduces the visibility of the target object by defocusing a display image of the target object.

3. The driving support apparatus according to claim 1, wherein
    the visibility reduction section reduces the visibility of the target object by decreasing color information of a display image of the target object.

4. The driving support apparatus according to claim 1, wherein the visibility reduction section reduces the visibility of the target object by decreasing an edge intensity of a display image of the target object.

5. The driving support apparatus according to claim 1, wherein
    the visibility reduction section prevents a visibility of the different object from being reduced in the vicinity image when the different object is displayed within the vicinity image in the display apparatus.

6. The driving support apparatus according to claim 5, wherein
    the different object includes at least either a traffic signal or a different vehicle different from the vehicle.

7. A driving support apparatus to support driving of a vehicle based on a vicinity state that is a state of vicinity of the vehicle while cooperating with a display apparatus, comprising:
    an information acquisition section to acquire vicinity information expressing the vicinity state of the vehicle;
    a recognition section to recognize at least one object in the vicinity of the vehicle based on the vicinity information acquired;
    a drawing section to display in the display apparatus a vicinity image that expresses the vicinity state of the vehicle based on the vicinity information acquired;
    an automatic driving section to provide a driving support to a driver of the vehicle by driving the vehicle automatically while noticing a predetermined target object when the predetermined target object is dissolved within the vicinity image in the display apparatus, the predetermined target object being included in the at least one object recognized in the vicinity of the vehicle by the recognition section; and
    a visibility reduction section to reduce a visibility of the predetermined target object when the target object is displayed within the vicinity image in the display apparatus, (i) the visibility of the predetermined target object is reduced by the visibility reduction section to indicate that the predetermined target object is already noticed by the automatic driving section, (ii) the visibility of an object other than the predetermined target object is not reduced by the visibility reduction section to indicate that the driver should pay attention to the predetermined target object which is unseen by the automatic driving section.

8. The driving support apparatus according to claim 7, wherein
the visibility reduction section prevents a visibility of a different object other than the predetermined target object from being reduced in the vicinity image when the different object is displayed in the vicinity image in the display apparatus.

9. The driving support apparatus according to claim 7, wherein
the visibility reduction section reduces the visibility of the target object by defocusing a display image of the target object.

10. The driving support apparatus according to claim 7, wherein
the visibility reduction section reduces the visibility of the target object by decreasing color information of a display image of the target object.

11. The driving support apparatus according to claim 7, wherein the visibility reduction section reduces the visibility of the target object by decreasing an edge intensity of a display image of the target object.

12. The driving support apparatus according to claim 7, wherein:
the at least one object recognized by the recognition section includes a pedestrian and a different object other than the pedestrian; and
the pedestrian that is recognized by the recognition section becomes the target object whose visibility is reduced by the visibility reduction section in the vicinity image, whereas the different object is prevented from becoming the target object whose visibility is reduced in the vicinity image by the visibility reduction section.

13. The driving support apparatus according to claim 12, wherein:
the different object includes at least either a traffic signal or a different vehicle different from the vehicle.

14. The driving support apparatus according to claim 1, wherein
the automatic driving section controls, for the vehicle, a fuel injection, a steering amount of the steering wheel, and a braking force of the brake without a driving manipulation of the driver of the vehicle and based in part on the recognition result by the recognition section,
the automatic driving section that drives the vehicle automatically is switched on responsive to a driving switch portion, and
the automatic driving section that drives the vehicle automatically is switched off based on the driving manipulation by the driver of the vehicle.

15. The driving support apparatus according to claim 7, wherein
the automatic driving section controls, for the vehicle, a fuel injection, a steering amount of the steering wheel, and a braking force of the brake without a driving manipulation of the driver of the vehicle and based in part on the recognition result by the recognition section,
the automatic driving section that drives the vehicle automatically is switched on responsive to a driving switch portion, and
the automatic driving section that drives the vehicle automatically is switched off based on the driving manipulation by the driver of the vehicle.

* * * * *